US012737498B2

(12) United States Patent
Joshi

(10) Patent No.: US 12,737,498 B2
(45) **Date of Patent: *Sep. 15, 2026**

(54) SYSTEM AND METHODS FOR SCANNING AND PROFILING DATA FOR SECURITY COMPLIANCE

(71) Applicant: Capital One Services, LLC, McLean, VA (US)

(72) Inventor: Rohit Joshi, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/454,959

(22) Filed: Jan. 21, 2026

(65) Prior Publication Data

US 2026/0147924 A1 May 28, 2026

Related U.S. Application Data

(63) Continuation of application No. 19/353,323, filed on Oct. 8, 2025, which is a continuation of application No. 18/363,073, filed on Aug. 1, 2023, now Pat. No. 12,468,845.

(51) Int. Cl.
*G06F 21/62* (2013.01)
*H04L 9/40* (2022.01)

(52) U.S. Cl.
CPC ...... *G06F 21/6245* (2013.01); *H04L 63/0209* (2013.01); *H04L 63/105* (2013.01); *H04L 63/205* (2013.01)

(58) Field of Classification Search
CPC ...... G06F 21/6245–6263; G06N 20/00; H04L 63/0209; H04L 63/105; H04L 63/205
See application file for complete search history.

(56) References Cited

U.S. PATENT DOCUMENTS

2003/0018608 A1* 1/2003 Rice ........................ G06F 21/14
2022/0382891 A1* 12/2022 Shmidov ................. G06N 5/04

* cited by examiner

*Primary Examiner* — Kevin Bechtel
(74) *Attorney, Agent, or Firm* — Banner & Witcoff, Ltd.

(57) ABSTRACT

Techniques are disclosed for performing scanning and profiling of stored data to identify the location of data entries that comprise sensitive data that require storage in accordance with enhanced security requirements. The techniques advantageously move a portion of the scanning and profiling operations closer to the data storage locations, and involve deploying processing resources near the locations at which the data is stored rather than relying solely upon centralizing processing at a separate location. This approach has the advantages of reducing network traffic and latency, which can help improve performance and reduce costs, and may also facilitate organizations to better take advantage of distributed computing architectures, which can scale more effectively than centralized processing.

20 Claims, 5 Drawing Sheets

200

SYSTEM AND METHODS FOR SCANNING AND PROFILING DATA FOR SECURITY COMPLIANCE

CROSS-REFERENCE TO RELATED APPLICATIONS AND INCORPORATION BY REFERENCE

The present application is a continuation of U.S. patent application Ser. No. 19/353,323, filed on Oct. 8, 2025, which is a continuation of U.S. patent application Ser. No. 18/363,073, filed on Aug. 1, 2023, the contents of which are incorporated herein by reference in their entirety.

TECHNICAL FIELD

This disclosure generally relates to the implementation of security policies to ensure the secure storage of sensitive data.

BACKGROUND

Various industries require storing data that is of a sensitive nature, which may include financial data such as account numbers, personal information, social security numbers, etc. Regulatory agencies often require that data of such a sensitive nature be stored in a more secure manner, such as via encryption and/or tokenization, to prevent or at least limit access by malicious parties. As additional data is stored, current storage infrastructures typically facilitate periodic data scanning and profiling operations to dynamically identify sensitive data and, once identified, to identify the data so that it can then be stored in a more secure manner. However, current techniques to perform this identification have various drawbacks, particularly with respect to security risks and the use of excessive processing resources.

BRIEF DESCRIPTION OF THE DRAWINGS/FIGURES

The accompanying drawings, which are incorporated herein and form a part of the specification, illustrate the embodiments of the present disclosure and, together with the description, and further serve to explain the principles of the aspects and to enable a person skilled in the pertinent art to make and use the embodiments.

The exemplary embodiments of the present disclosure will be described with reference to the accompanying drawings. The drawing in which an element first appears is typically indicated by the leftmost digit(s) in the corresponding reference number.

DETAILED DESCRIPTION

Figure 1:
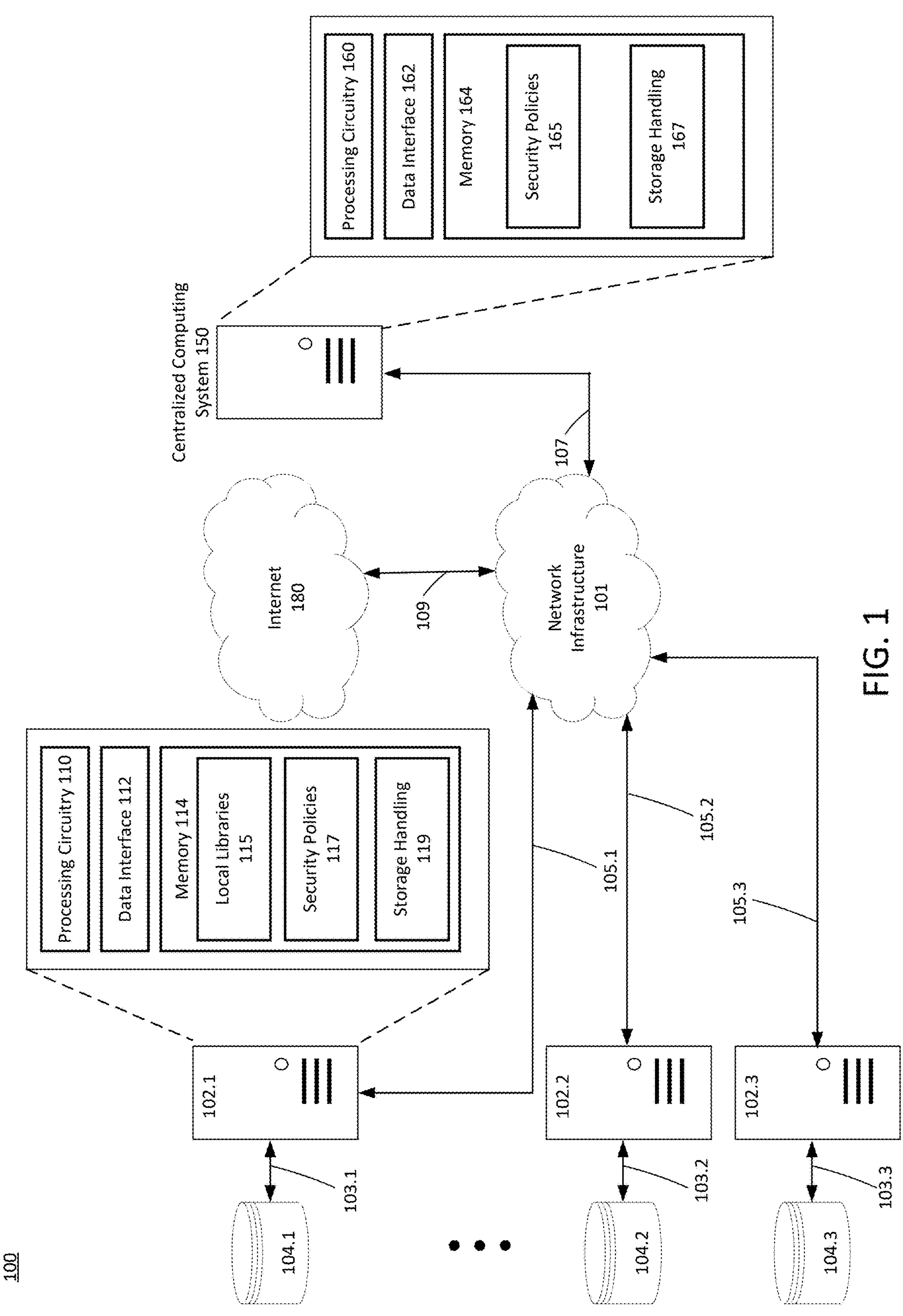
FIG. 1 illustrates an example data storage architecture in accordance with one or more embodiments of the disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Many entities require storing large amounts of data within a data storage infrastructure, which may comprise sensitive and non-sensitive data. Such data storage infrastructures may comprise, for instance, a large number of databases, which are connected to a central computing system via a number of network connections. Such a data storage infrastructure may be implemented, for example, as part of a federated data storage system, and require continuous identification of sensitive data to meet industry regulations. Thus, conventional systems utilize a centralized computing system to perform data scanning and profiling operations to identify which stored data entries contain sensitive data. The centralized computing system then publishes these results, typically in the form of metadata that is transmitted to specific applications such that encryption and/or tokenization may be performed, or to otherwise ensure regulatory compliance is met.

However, and as noted above, conventional techniques to perform secure data identification from the scanning and profiling of stored data entries have various drawbacks. This is particularly with respect to the use of a centralized computing system that typically performs the scanning and profiling operations. For example, such a centralized computing system is given access to all stored data to perform the scanning operations. Doing so represents a significant security risk, as a compromised application allows a malicious party to potentially gain access to sensitive data across an entire company. In addition to this risk, data needs to be sent to the centralized computing system utilizing multiple intermediary applications (API Gateway, Load Balancers, Streaming services etc.), which could potentially leak the sensitive data. Thus, to mitigate this data leak risk, sensitive data needs to be encrypted before being sent to the centralized computing system, which may be located remote to the data storage infrastructure.

Furthermore, the additional step of profiling the data, which is used to verify that sensitive data represents a specific type of data that needs to be subjected to higher security requirements, also requires significant computational resources and adds to the overall complexity of the system. This is particularly true when profiling data across multiple federated data stores. This level of computational power can be costly and may not be feasible for all organizations.

Additionally, network bandwidth may represent a bottleneck when scanning across federated data stores, as a significant amount of data needs to be fed into the centralized computing system. In particular, reading data from multiple data stores requires significant bandwidth, and this can impact other real-time and batch applications. It can also consume bandwidth across multiple intermediaries, such as API Gateway, Application, and Network Load Balancers.

The embodiments described herein address these issues and are directed to applying various security policies, which include scanning and profiling stored data at various stages, to identify the location of data entries that comprise sensitive data that requires storage to meet enhanced security requirements. The embodiments described herein advantageously move a portion of the scanning and profiling operations closer to the data storage locations, and involve deploying processing resources near the locations at which the data is stored rather than relying solely upon centralizing processing at a separate location. This approach has several advantages. First, it can significantly reduce network traffic and latency, which can improve performance and reduce costs. Second, it can help organizations take advantage of distributed computing architectures, which can scale more effectively than centralized processing.

To do so, and as discussed in further detail below, the embodiments described herein may implement "serverless" applications that are executed on clients (e.g. local computing devices, an agent running on application service instance, serverless infrastructure provided by the cloud service providers, etc.) that are close to the data storage components from which data is scanned, with a large portion of the scanning and profiling operations being performed on the local clients. The scanning and profiling operations may be performed during off-peak hours, e.g. overnight or when processing resources are not in high demand to run other applications. The data scanning and profiling operations may be performed in accordance with one or more security policies, which may implement predetermined rules, machine learning techniques, or other suitable applications that function to identify data entries that are most likely to comprise either sensitive or non-sensitive data. The local client may then tag these entries so that the appropriate actions may be performed, such as subsequently encrypting and/or tokenizing the data entries having sensitive data.

For entries that cannot be confidently identified as comprising sensitive or non-sensitive data, additional security policies may be performed via the client devices or via other computing devices to attempt to make this determination. For instance, if a local client device is still unable to confidently identify the data entries as comprising sensitive or non-sensitive data, then a subset of such data entries may be subjected to further processing locally or transmitted to another computing device, which applies further security policies to make this determination. The additional computing device may comprise the aforementioned centralized computing system or other computing system. Such systems may have additional and/or higher-processor intensive resources to enable the classification of the stored data entries as comprising either sensitive or non-sensitive data, as well as tagging the data in a similar manner as described above.

For example, the additional computing device may be identified with one that conventionally handles such classifications within a data storage infrastructure. However, for such conventional systems, the centralized system needs to process all data entries as opposed to a smaller subset of data entries that could not be confidently classified via the locally-executed computing devices. Thus, the embodiments discussed herein advantageously reduce the need for such a centralized computing system as part of the data scanning and profiling operations, and also reduce the bandwidth that is required to pass data from each of the connected databases to the centralized server. Thus, the embodiments as described herein may be particularly advantageous for data storage architectures that utilize a centralized server or other computing device for sensitive data classification, and may be implemented as any suitable type of data storage architectures, such as those utilizing federated data, for example. This also eliminates the risk of a compromise due to the centralized computing system having access to the entirety of the federated data-store. Instead, each local processing unit has limited read access to the data-stores associated with their own-service, and authentications/authorization are managed within their application/infrastructure using existing vault/identity-access management services.

A computing device is provided. The computing device comprises a memory configured to store instructions, and processing circuitry configured to execute the instructions stored in the memory to cause the computing device to: determine a location, in a network comprising a plurality of different data storage components, of a predetermined number of data entries; cause instantiation of an application that is configured to determine whether each of the predetermined number of data entries comprises sensitive or non-sensitive data by: processing a subset of the predetermined number of data entries in accordance with a first security policy to compute a confidence score associated with the subset of the predetermined number of data entries stored in a data storage component comprising sensitive data; based on a determination that the confidence score is between a first predetermined confidence score threshold and a second predetermined confidence score threshold, processing at least a portion of the subset of the predetermined number of data entries in accordance with a second security policy to compute an updated confidence score associated with the subset of the predetermined number of data entries comprising sensitive data, based on a determination that the updated confidence score is between the first predetermined confidence score threshold and the second predetermined confidence score threshold, sending the at least the portion of the subset of the predetermined number of data entries to a further computing device, the further computing device processing the at least the portion of the subset of the predetermined number of data entries in accordance with a third security policy to verify whether the at least the portion of the subset of the predetermined number of data entries comprise sensitive or non-sensitive data; computing a further updated confidence score associated with the subset of the predetermined number of data entries comprising sensitive data based upon a result of processing the at least the portion of the subset of the predetermined number of data entries in accordance with the third security policy; and based on a determination that the further updated confidence score is greater than the second predetermined confidence score threshold, storing, in the data storage component, the predetermined number of data entries as encrypted data entries that satisfy a predefined security requirement. In addition or in alternative to and in any combination with the optional features previously explained in this paragraph, the processing circuitry is configured to execute the instructions stored in the memory to cause the computing device, via instantiation of the application, to process a further subset of the predetermined number of data entries in accordance with the first security policy when the further updated confidence score is between the first predetermined confidence score threshold and the second predetermined confidence score threshold. In addition or in alternative to and in any combination with the optional features previously explained in this paragraph, the processing circuitry is configured to execute the instructions stored in the memory to cause the computing device, via instantiation of the application, to transmit the at least a portion of the subset of the predetermined number of data entries to the further computing device as encrypted and tokenized data within a network environment. In addition or in alternative to and in any combination with the optional features previously explained in this paragraph, the computing device comprises a client device that is directly coupled to the data storage component, and is configured to access the predetermined number of data entries directly from the data storage component, and the processing circuitry is configured to execute the instructions stored in the memory to cause instantiation of the application locally on the client device. In addition or in alternative to and in any combination with the optional features previously explained in this paragraph, the processing circuitry is configured to execute the instructions stored in the memory to cause the computing device to determine the location of the predetermined number of data entries stored in the data storage component in response to one or more triggering conditions being met, wherein the one or more triggering conditions comprise one or more of a time of day, CPU usage being less than a predetermined threshold CPU usage value, or a memory usage being less than a predetermined memory usage value. In addition or in alternative to and in any combination with the optional features previously explained in this paragraph, the processing of the subset of the predetermined number of data entries in accordance with the first security policy comprises executing a machine learning algorithm to determine whether each one of the predetermined number of data entries in the subset matches a predefined data format identified with sensitive data. In addition or in alternative to and in any combination with the optional features previously explained in this paragraph, the processing of the subset of the predetermined number of data entries in accordance with the first security policy comprises using stored metadata as feedback to the machine learning algorithm that indicates which data entries were previously identified as comprising sensitive or non-sensitive data. In addition or in alternative to and in any combination with the optional features previously explained in this paragraph, the processing of the subset of the predetermined number of data entries in accordance with the second security policy comprises executing a further machine learning algorithm to determine whether each one of the predetermined number of data entries in the subset comprises data having a data structure that matches a predefined structure that is identified with a sensitive data type. In addition or in alternative to and in any combination with the optional features previously explained in this paragraph, the processing of the subset of the predetermined number of data entries in accordance with the third security policy comprises verifying a validity of the subset of the predetermined number of data entries based upon a data type. In addition or in alternative to and in any combination with the optional features previously explained in this paragraph, the processing circuitry is configured to execute the instructions stored in the memory to cause the computing device to, via instantiation of the application, to: store metadata that identifies a location of the predetermined number of data entries, and use the metadata to determine a location of a further subset of a further predetermined number of data entries that are subsequently processed in accordance with the first security policy.

A computer-implemented method is provided. The computer-implemented method, comprises: determining a location, in a network comprising a plurality of different data storage components, of a predetermined number of data entries; causing instantiation of an application that is configured to determine whether each of the predetermined number of data entries comprises sensitive or non-sensitive data by: processing a subset of the predetermined number of data entries in accordance with a security policy to compute a confidence score associated with the subset of the predetermined number of data entries stored in a data storage component comprising sensitive data; based on a determination that the confidence score is between a first predetermined confidence score threshold and a second predetermined confidence score threshold, transmitting at least a portion of the subset of the predetermined number of data entries to a further computing device as encrypted and tokenized data within a network environment, wherein the further computing device processes the at least the portion of the subset of the predetermined number of data entries in accordance with a further security policy to verify whether the at least the portion of the subset of the predetermined number of data entries comprise sensitive or non-sensitive data; computing an updated confidence score associated with the subset of the predetermined number of data entries comprising sensitive data based upon a result of the at least a portion of the subset of the predetermined number of data entries being processed in accordance with the further security policy; and based on a determination that the updated confidence score is greater than the second predetermined confidence score threshold, storing, in the data storage component, the predetermined number of data entries as encrypted data entries that satisfy a predefined security requirement. In addition or in alternative to and in any combination with the optional features previously explained in this paragraph, the computer-implemented method further comprises processing a further subset of the predetermined number of data entries in accordance with the security policy when the further updated confidence score is between the first predetermined confidence score threshold and the second predetermined confidence score threshold. In addition or in alternative to and in any combination with the optional features previously explained in this paragraph, the processing of the subset of the predetermined number of data entries in accordance with the security policy comprises executing a machine learning algorithm to determine whether each one of the predetermined number of data entries in the subset matches a predefined data format identified with sensitive data. In addition or in alternative to and in any combination with the optional features previously explained in this paragraph, the processing of the subset of the predetermined number of data entries in accordance with the security policy comprises using metadata as feedback to the machine learning algorithm that indicates which data entries were previously identified as comprising sensitive or non-sensitive data. In addition or in alternative to and in any combination with the optional features previously explained in this paragraph, the processing of the subset of the predetermined number of data entries in accordance with the further security policy comprises executing a further machine learning algorithm to determine whether each one of the predetermined number of data entries in the subset comprises data having a data structure that matches a predefined structure that is identified with a sensitive data type. In addition or in alternative to and in any combination with the optional features previously explained in this paragraph, the processing of the predetermined number of data entries in accordance with the further security policy comprises verifying a validity of the subset of the predetermined number of data entries based upon data type.

A non-transitory computer-readable medium is provided. The non-transitory computer-readable medium has instructions stored thereon that, when executed by processor circuitry of a computing device, cause the computing device to determine whether stored data entries comprises sensitive or non-sensitive data by: determining a location, in a network comprising a plurality of different data storage components, of a predetermined number of data entries; processing a subset of the predetermined number of data entries in accordance with a security policy to compute a confidence score associated with the subset of the predetermined number of data entries stored in a data storage component comprising sensitive data; based on a determination that the confidence score is between a first predetermined confidence score threshold and a second predetermined threshold confidence score, processing at least a portion of the subset of the predetermined number of data entries in accordance with a further security policy to compute an updated confidence score associated with the subset of the predetermined number of data entries comprising sensitive data; determining that the updated confidence score is greater than the second predetermined threshold confidence score; and storing, in the data storage component, the predetermined number of data entries as encrypted data entries that satisfy a predefined security requirement. In addition or in alternative to and in any combination with the optional features previously explained in this paragraph, the instructions, when executed by the processor circuitry, further cause the computing device to process the subset of the predetermined number of data entries stored in the data storage component in accordance with the security policy in response to one or more triggering conditions being met, wherein the one or more triggering conditions comprise one or more of a time of day, CPU usage being less than a predetermined threshold CPU usage value, or memory usage being less than a predetermined memory usage value. In addition or in alternative to and in any combination with the optional features previously explained in this paragraph, the instructions, when executed by the processor circuitry, further cause the computing device to process the subset of the predetermined number of data entries in accordance with the security policy by executing a machine learning algorithm to determine whether each one of the predetermined number of data entries in the subset matches a predefined data format identified with sensitive data. In addition or in alternative to and in any combination with the optional features previously explained in this paragraph, the instructions, when executed by the processor circuitry, further cause the computing device to store metadata that identifies a location of the predetermined number of data entries, and use the metadata to determine a location of a further subset of a further predetermined number of data entries that are subsequently processed in accordance with the security policy.

FIG. 1 illustrates an example data storage architecture in accordance with one or more embodiments of the present disclosure. The data storage architecture 100 may be implemented to facilitate the storage of any suitable number of data entries stored across any suitable number of data storage components. As noted above, the data entries may comprise sensitive as well as non-sensitive data, and the data storage architecture 100 may ensure that the data entries comprising sensitive data are stored in a manner that meets regulatory requirements.

To do so, the data storage architecture 100 as shown in FIG. 1 comprises any suitable number of data storage components, with three data storage components 104.1-104.3 being shown in FIG. 1 for purposes of brevity. The data storage architecture 100 may enable the storage of data in accordance with any suitable type of data storage infrastructure. For instance, the data storage architecture 100 may be implemented as part of a centralized or distributed federated database system, with each of the data storage components 104.1-104.3 being identified with a portion of such a federated database that is monitored and/or managed via the centralized computing system 150, as further discussed herein. The data storage components 104.1-104.3 may be implemented as any suitable type of data storage components, and may represent databases, portions of databases, hard drives, servers with accessible storage, cloud storage, etc. In some embodiments, the data storage components 104.1-104.3 may be implemented partially or wholly as part of their respectively coupled local computing device 102.1-102.3, whereas in other embodiments the data storage components 104.1-104.3 may be implemented as storage components that are implemented separately from the local computing devices 102.1-102.3, as shown in FIG. 1. Regardless of their particular implementation, the data storage components 104.1-104.3 are configured to store any suitable number of data entries in having any suitable type of data structure.

The data storage architecture 100 may also comprise any suitable number of local computing devices 102.1-102.3, with three also being shown in FIG. 1 for purposes of brevity. The local computing devices 102.1-102.3 may be alternatively referred to herein as local client devices or simply as clients. Each of the computing devices 102.1-102.3 may be implemented as any suitable type of computing device. For example, the local computing devices 102.1-102.3 may be implemented as a personal computer, a laptop, a cloud computing device, etc. Each of the local computing devices 102.1-102.3 may comprise hardware components, software components, or combinations of these execute any suitable number of local applications. The local computing devices 102.1-102.3 may utilize, process, and/or access data stored in the data storage components 104.1-104.3 as part of the execution of such applications.

Each of the local computing devices 102.1-102.3 is configured to access data stored in the data storage components 104.1-104.3 in any suitable manner. For example, in some embodiments, each local computing device 102.1-102.3 may be communicatively coupled to a respective data storage component 104.1-104.3 directly, as depicted in FIG. 1. Thus, each of the data storage components 104.1-104.3 may be coupled to a respective data storage component 104.1-104.3 via a link 103.1-103.3, each representing any suitable number and/or type of wired and/or wireless links to support data communications in accordance with any suitable number and/or type of communication protocols.

Additionally or alternatively, each of the data storage components 104.1-104.3 may access data stored in any of the other data storage components 104.1-104.3. Such access may be supported, for example, using communications that are facilitated via the network infrastructure 101 and links 105.1-105.3. The network infrastructure 101 may represent any suitable number and/or type of network components such as routers, switches, additional servers and/or computing devices, firewalls, ports, wired and/or wireless links, etc. Thus, the links 105.1-105.3 may likewise represent any suitable number and/or type of wired and/or wireless links to support data communications in accordance with any suitable number and/or type of communication protocols.

The computing devices 102.1-102.3 may communicate with the centralized computing system 150 as further discussed herein utilizing the network infrastructure 101. The centralized computing system 150 may be implemented as any suitable type of computing device comprising hardware components, software components, or combinations of these to execute any suitable number of applications. For example, the centralized computing system 150 may be implemented as a personal computer, a laptop, a cloud computing device, a server, etc. The centralized computing system 150 may also be communicatively coupled to the network infrastructure 101 via the links 107, which may represent any suitable number and/or type of wired and/or wireless links to support data communications in accordance with any suitable number and/or type of communication protocols. Thus, the centralized computing system 150 may also utilize, process, and/or access data stored in the data storage components 104.1-104.3 via the network infrastructure 101.

Furthermore, the links 109 may represent any suitable number and/or type of wired and/or wireless links to support data communications in accordance with any suitable number and/or type of communication protocols. The links 109 may facilitate a connection to the Internet 180 for the local computing devices 102.1-102.3 and the centralized computing system 150. Thus, the local computing devices 102.1-102.3 and the centralized computing system 150 may communicate with one another, external applications, and/or data sources via the Internet 180, as well as access data stored in the data storage components 104.1-104.3 The local computing devices 102.1-102.3 and the centralized computing system 150 may both access data stored in the data storage components 104.1-104.3 to classify data as being sensitive or non-sensitive via the application of various security policies as discussed in greater detail below, as well as perform other tasks that ensure that sensitive data is stored in accordance with regulatory requirements. However, and as further discussed herein, the centralized computing system 150 may comprise additional and/or more robust security policies compared to those executed via the local computing devices 102.1-102.3.

Again, the data storage architecture 100 may store sensitive and non-sensitive data entries across any suitable number of data storage components, and additional data may be added to these data storage components over time. Thus, the data storage architecture 100 periodically performs what are referred to herein as scanning and profiling operations to identify data entries that need to be subjected to enhanced security requirements (e.g. encryption and/or tokenization) to ensure regulatory compliance. As discussed in further detail herein, these scanning and profiling operations are part of the various security policies that may be implemented by the local computing devices 102.1-102.3 and the centralized computing system 150.

To do so, the computing devices 102.1-102.3 may each include processing circuitry 110, a data interface 112, and a memory 114. The components of the computing devices 102.1-102.3 as shown in FIG. 1 are provided for ease of explanation, and the computing devices 102.1-102.3 may implement additional, less, or alternative components as those shown in FIG. 1. Furthermore, although the embodiments are discussed herein with respect to the computing devices 102.1-102.3 storing, accessing, and/or executing data and/or instructions with respect to the memory 114, the data and/or instructions may additionally or alternatively be stored, accessed, and or executed from any suitable storage device, which may be integrated as part of or separate from the computing devices 102.1-102.3 (e.g. networked storage, cloud storage, etc.) to perform any of the embodiments as discussed herein.

The processing circuitry 110 may be configured as any suitable number and/or type of computer processors, which may function to control each respective computing device 102.1-102.3. The processing circuitry 110 may be identified with one or more processors (or suitable portions thereof) implemented by each respective computing device 102.1-102.3. The processing circuitry 110 may be identified with one or more processors such as a host processor, a digital signal processor, one or more microprocessors, graphics processors, a graphics processing unit (GPU), baseband processors, microcontrollers, an application-specific integrated circuit (ASIC), part (or the entirety of) a field-programmable gate array (FPGA), etc.

The processing circuitry 110 may be configured to carry out instructions to perform arithmetical, logical, and/or input/output (I/O) operations, and/or to control the operation of one or more components of each respective computing device 102.1-102.3 to perform the various functions as described herein. The processing circuitry 110 may include one or more microprocessor cores, memory registers, buffers, clocks, etc., and may generate electronic control signals associated with the components of each respective computing device 102.1-102.3 to control and/or modify the operation of these components. The processing circuitry 110 may communicate with and/or control functions associated with the data interface 112 and/or the memory 114. The processing circuitry 110 may be configured as any suitable number and/or type of components configured to facilitate each respective computing device 102.1-102.3 performing the various functions as discussed herein and as shown in the accompanying Figures.

The data interface 112 may be implemented as any suitable number and/or type of components that function to enable each respective computing device 102.1-102.3 to interface with additional devices, and may implement for instance buses, ports, drivers, adapters, etc. The data interface 112 may form part of an overall communication circuitry implemented by each respective computing device 102.1-102.3, which may communicate with other computing devices as discussed herein to receive and/or transmit data. For instance, the data interface 112 may enable each respective computing device 102.1-102.3 to access data entries stored in the data storage components 104.1-104.3, to publish metadata regarding the location and status of data entries as comprising sensitive or non-sensitive data, to encrypt data entries, to transmit data entries to the centralized computing system 150, etc.

The memory 114 is configured to store data and/or instructions such that, when executed by the processing circuitry 110, cause each respective computing device 102.1-102.3 to perform various functions as described herein with respect to the application of various security policies. The memory 114 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 114 may be non-removable, removable, or a combination of both. The memory 114 may be implemented as a non-transitory computer readable medium storing one or more executable instructions such as, for example, logic, algorithms, code, etc.

As further discussed below, the instructions, logic, code, etc., stored in the memory 114 are represented by the various components as shown in FIG. 1, which may enable the various functions of the aspects as described herein to be functionally realized. Alternatively, if implemented via hardware, the memory components as shown in FIG. 1 may include instructions and/or code to facilitate control and/or to monitor the operation of such hardware components. In other words, the memory components as shown in FIG. 1 are provided for ease of explanation regarding the functional association between hardware and software components. Thus, the processing circuitry 110 may execute the instructions stored in these respective memory components in conjunction with one or more hardware components to perform the various functions as discussed herein.

The centralized computing system 150 may comprise processing circuitry 160, a data interface 162, and a memory 164. The components of centralized computing system 150 as shown in FIG. 1 are also provided for ease of explanation, and the centralized computing system 150 may implement additional, less, or alternative components as those shown in FIG. 1.

The processing circuitry 160 may be configured as any suitable number and/or type of computer processors, which may function to control the centralized computing system 150. The processing circuitry 160 may be identified with one or more processors (or suitable portions thereof) implemented by the centralized computing system 150. The processing circuitry 160 may be identified with one or more processors such as a host processor, a digital signal processor, one or more microprocessors, graphics processors, a graphics processing unit (GPU), baseband processors, microcontrollers, an application-specific integrated circuit (ASIC), part (or the entirety of) a field-programmable gate array (FPGA), etc.

The processing circuitry 160 may be configured to carry out instructions to perform arithmetical, logical, and/or input/output (I/O) operations, and/or to control the operation of one or more components of the centralized computing system 150 to perform the various functions as described herein. The processing circuitry 160 may include one or more microprocessor cores, memory registers, buffers, clocks, etc., and may generate electronic control signals associated with the components of the centralized computing system 150 to control and/or modify the operation of these components. The processing circuitry 160 may communicate with and/or control functions associated with the data interface 162 and/or the memory 164. The processing circuitry 160 may be configured as any suitable number and/or type of components configured to facilitate the centralized computing system 150 performing the various functions as discussed herein and as shown in the accompanying Figures.

The data interface 162 may be implemented as any suitable number and/or type of components that function to enable the centralized computing system 150 to interface with additional devices, and may implement for instance buses, ports, drivers, adapters, etc. The data interface 162 may form part of an overall communication circuitry implemented by the centralized computing system 150, which may communicate with other computing devices as discussed herein to receive and/or transmit data.

The memory 164 is configured to store data and/or instructions such that, when executed by the processing circuitry 160, cause the centralized computing system 150 to perform various functions as described herein. The memory 164 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 164 may be non-removable, removable, or a combination of both. The memory 164 may be implemented as a non-transitory computer readable medium storing one or more executable instructions such as, for example, logic, algorithms, code, etc.

As further discussed below, the instructions, logic, code, etc., stored in the memory 164 are represented by the various components as shown in FIG. 1, which may enable the various functions of the aspects as described herein to be functionally realized. Alternatively, if implemented via hardware, the memory components as shown in FIG. 1 may include instructions and/or code to facilitate control and/or monitor the operation of such hardware components. In other words, the memory components as shown in FIG. 1 are provided for ease of explanation regarding the functional association between hardware and software components. Thus, the processing circuitry 160 may execute the instructions stored in these respective memory components in conjunction with one or more hardware components to perform the various functions as discussed herein, such as the application of various security policies.

Again, the embodiments described herein leverage the computing devices 102.1-102.3, which may be located physically closer to the various data storage components 104.1-104.3, and which may function to offload at least a portion of the processing operations that are traditionally performed by the centralized computing system 150 in a conventional data storage architecture to identify sensitive and non-sensitive data entries. To do so, each of the computing devices 102.1-102.3 may store (e.g. in their respective memories 114) a set of local libraries 115 that may be instantiated as part of an executable application that operates on a range of data entries stored in the data storage components 104.1-104.3. That is, each of the computing devices 102.1-102.3 may utilize a range of data stored in the data storage components 104.1-104.3, and thus have access to this data. Thus, the embodiments as described herein enable the computing devices 102.1-102.3 to instantiate a locally-stored application that references the local libraries 115 to run as a serverless component. In this context, "serverless" means that the locally-stored application need not be stored and/or executed remotely, but instead may be instantiated locally and independently from the centralized computing system 150 and/or other networked components. Additionally or alternatively, the local libraries 115 may be accessed by an existing application that is implemented on the computing devices 102.1-102.3 to provide the additional functions as discussed herein while re-using the client's existing applications and infrastructure.

The computing devices 102.1-102.3 may thus instantiate one or more local applications, which are represented in FIG. 1 as the security policies 117, to perform various data scanning and profiling operations to differentiate data entries that comprise sensitive versus non-sensitive data. As a result of the local instantiation of the application and local libraries 115 to perform these operations, the embodiments described herein may advantageously execute such operations when network and/or processing resources are more readily available. Moreover, the libraries 115 function to control access to the data stored in the data storage components 104.1-104.3 via the computing devices 102.1-102.3 by enforcing access within the control of the network boundaries of the data storage architecture 100, thereby enhancing security.

For example, the computing devices 102.1-102.3 may implement any suitable number and/or type of predefined triggering conditions that, when met, result in the computing devices 102.1-102.3 initiating data scanning and profiling operations that implement the various security policies described herein, which may be applied with respect to data entries that are stored in the data storage components 104.1-104.3. As discussed in further detail below, such operations may begin with the determination of a location of a predetermined number of data entries stored in one of the data storage components 104.1-104.3. The predefined triggering conditions may comprise any suitable type of conditions such that, when any combination of the triggering conditions are met, the client device (i.e. one of the computing devices 102.1-102.N) initiates the data scanning and profiling operations as discussed herein at a starting location within the predetermined number of data entries, e.g. data entries stored in the data storage components 104.1-104.3.

To provide some examples, the predefined triggering conditions may comprise a time of day, expiration of a set timer, CPU usage being less than a predetermined threshold CPU usage value, or a memory usage being less than a predetermined memory usage value, etc. Thus, upon one or more such triggering conditions being met, the computing devices 102.1-102.3 may then access a predetermined number of data entries in a locally-connected data storage component 104.1-104.3. Then, at least a subset of the predetermined number of data entries are subjected to processing in accordance with the various security policies as discussed herein. As a result of the application of these security policies, a client device may compute a confidence score, which may drive the decision to apply additional security policies or to identify data entries as comprising secure or non-secure data.

Figure 2:
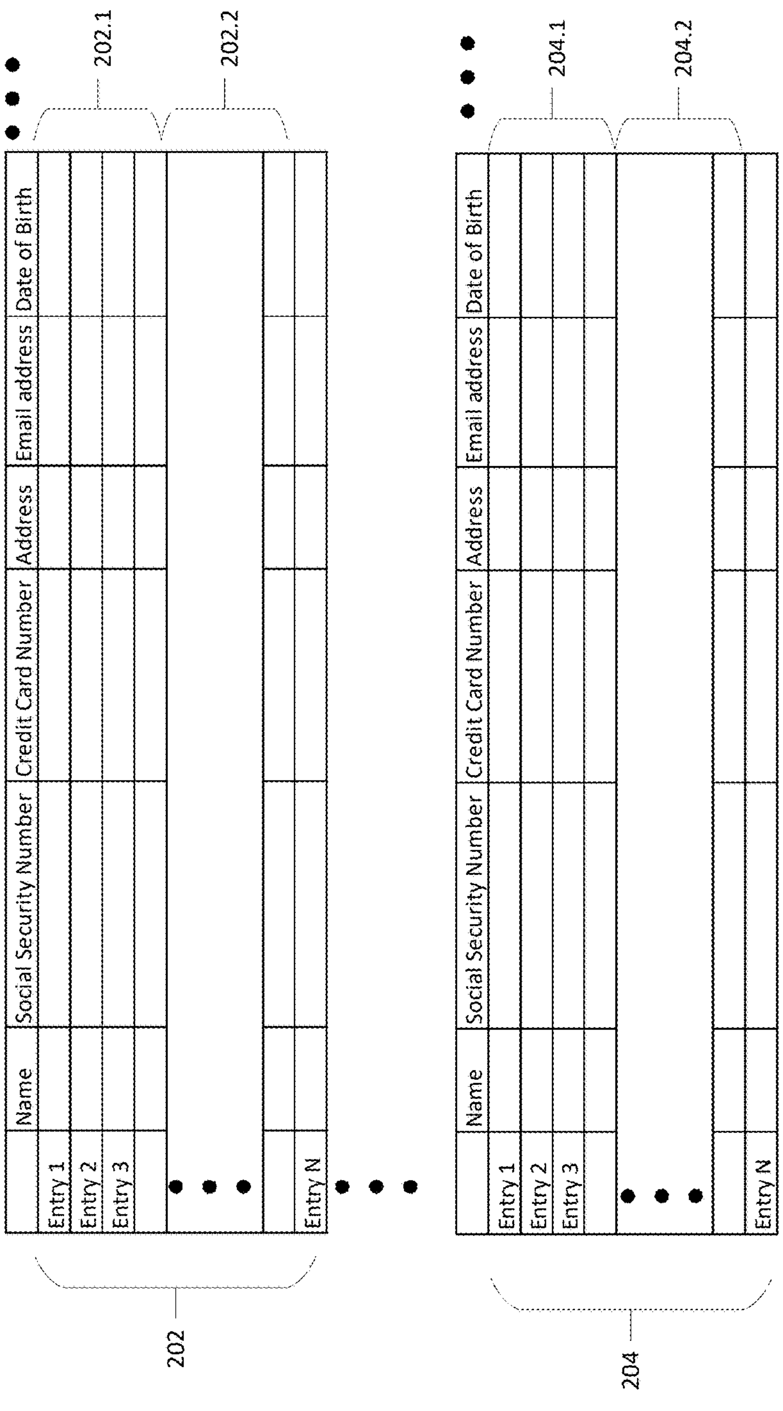
FIG. 2 illustrates a set of data entries, in accordance with one or more embodiments of the disclosure.

For example, FIG. 2 illustrates an example data structure that may be implemented by the data entries stored in the data storage components 104.1-104.3 as discussed herein. The data structure as shown in FIG. 2 is provided by way of example and not limitation, and the embodiments as described herein may operate on data entries stored in accordance with any suitable data structure. The data structure as shown in FIG. 2 is a table structure, which may be used by a federated data storage system that stores a large number of data entries that may comprise sensitive data. For instance, the data entries in the table may correspond to customer information for a financial instruction, with each entry or row corresponding to a different customer or other entity. Each entity (i.e. each row) may be identified with a set of columns, each comprising a separate data entry that may or may not contain sensitive data. It is a goal of the embodiments as discussed herein to readily identify whether these data entries comprise sensitive or non-sensitive data with a high level of confidence, and to then take the appropriate action in response to these determinations. Moreover, the data storage components 104.1-104.3 may store data entries such that each table (i.e. each predetermined number of data entries) has an accompanying schema, as well as various columns with labels regarding the data entries stored in those respective columns.

In any event, upon being triggered in accordance with any of the triggering conditions described above, each computing device 102.1-102.3 is configured to access its respectively coupled local data storage component 104.1-104.3, and to apply the various security policies as discussed herein to at least a portion of the predetermined number of the data entries. These security policies are, in the example of a data table structure, applied to data entries on a per-column basis, i.e. applied to each individual column within the table data structure. Thus, upon being triggered, a client device may first determine whether information is available that may identify a specific column as likely containing sensitive data. For example, the schema and/or column label may be read initially and compared to a set of predefined schemas and/or label types, and an initial confidence score may then be computed based upon this information.

This confidence score may represent a likelihood that a column of data entries contains sensitive data. For example, a confidence score may be initially set to a predetermined value of 50%, 60%, 70%, etc., when a column label indicates "social security number," "credit card number," etc. If the schema and/or column label data is not available, alternative techniques may be implemented to attempt to identify the type of data stored in a particular column to which the security policies are to be applied. For instance, metadata, headers, and/or comma separated values (CSV) may be read to determine whether a column has a label that is known to be identified with a particular type of sensitive data.

If information regarding the data type in a column cannot be obtained using the aforementioned techniques (e.g. because this data is not available), then the client device may alternatively apply one or more initial data profiling operations to one or more data entries (e.g. a single data entry in a column). This may include, for example, applying one or more Regular Expressions (RegExs) to the data to determine a data length, a data format, specific characters, etc. Based upon the outcome of applying the regular expressions, a determination may be made regarding the initial confidence score. For example, because social security numbers are known to have a format of XXX-XX-XXXX, a data entity matching this length and/or format may be used to calculate a corresponding initial confidence score. As another alternative, the initial confidence score may be set to a default (i.e. a predetermined value).

In any event, an initial confidence score is established prior to the security policies being applied. The initial confidence score may be compared to a range of predetermined thresholds that are mapped to a number of a subset of the predetermined data entries (e.g. for a specific column of data) that are to be subjected to the various security policies as discussed herein. For example, a higher initial confidence score may result in the client device applying one or more security policies to a smaller amount of data entries within a column (i.e. a smaller subset), whereas a smaller confidence score may result in the client device applying one or more security policies to a larger amount of data entries within a column (i.e. a larger subset). Additionally, and as further noted herein, the name and/or schema of columns and tables may contribute to the initial confidence score. For instance, column names such as "SSN" or "Social Security Number" may increase the initial confidence score for SSN identification. As further discussed herein, changes to the confidence score over time (i.e. as the security policies are applied) are used to drive the selection and application of additional security policies, as well as the size of the number of data entries that are subsequently processed.

Thus, using the initial confidence score, embodiments include any of the computing devices 102.1-102.3 retrieving a predetermined number of data entries from a locally-coupled data storage component 104.1-104.3 or, alternatively, from any of the data storage components 104.1-104.3. The location may be defined in any suitable manner based upon the particular data structure that is used to store the data entries in the data storage component 104.1-104.3. For example, the location may be a starting row or other suitable unique address. As further discussed herein, this location may be a randomly selected starting location of a predetermined number of data entries 202, or may be determined from a tag or other information (such as metadata) that has been stored as a result of a previous application of security policies. In the former scenario, the stored tag may indicate the ending location of a previous application of security policies and thus may be used to identify a starting location for subsequent processing of data entries, as further discussed herein. The location of the predetermined number of data entries that are subjected to processing in accordance with the various security policies as discussed herein may also be updated over time, such that data entries that have not changed since previous processing operations need not be re-processed.

The client device may access the predetermined number of data entries 202, which may be temporarily stored in the memory 114, to facilitate the execution of the various security policies as discussed herein. Again, these security policies may be executed via the instantiation of the security policies 117 in the memory 114, which may utilize the local libraries 115. As shown in FIG. 2, the predetermined number of data entries 202 forms a data table, and comprises any suitable number of data entries that are sampled by a computing device 102.1-102.3 from one of the data storage components 104.1-104.3, e.g. from a respectively-coupled data storage component as shown in FIG. 1. The number of the predetermined number of data entries that are accessed upon the triggering conditions being met, i.e. which form the range of the table as shown in FIG. 2, may be configurable and may represent any suitable number of data entries depending upon the processing capabilities of the computing devices 102.1-102.3, as well as any other suitable factors that may be considered. For example, the size of the predetermined number of data entries 202, 204 may constitute a proportion of the total data stored in a data storage component 104.1-104.3 to which a respective computing device 102.1-102.3 is locally coupled, and which the computing device 102.1-102.3 has access to. For instance, and using the client device 102.1 as an example, the predetermined number of the data entries in the table may be 5%, 10%, etc., of a total number of data entries stored in the data storage component 104.1.

Once the predetermined number of data entries 202 are accessed, the client device may apply, as one of the security policies, any suitable number of predetermined rules to a subset of the data entries in a respective column to initially identify each data entry in the subset as comprising either sensitive or non-sensitive data. In other words, and with reference to FIG. 2, a confidence score may be computed from a sampled subset 202.1 of the data entries 202. An initial or "first" security policy may comprise a process that is referred to herein as a data scanning operation. Examples of the predetermined rules that may be executed as part of the first security policy to realize the data scanning operation may include pre-processing, post-processing, the application of one or more Regular Expressions (RegExs) that may identify specific lengths, prefixes, suffixes, etc. Additionally or alternatively, the predetermined rules may comprise accessing one or more lookup tables, executing known algorithms such as a LUHN check algorithm, executing light weight machine learning algorithms that are trained on a limited trained data set (e.g. character level CNN/LSTM, etc.), etc.

For example, the execution of a light weight machine learning algorithm may be trained to identify whether each one of the subset of the of data entries 202.1 comprises data having a data structure that matches a predefined structure that is identified with a sensitive data type. The light weight machine learning algorithm may include, for instance, a machine learning algorithm that is trained on a limited or smaller set of training data and/or to perform a limited or smaller number of predictions with respect to the data entries. The smaller set of training data and/or limited predictions may be with respect to the other machine learning algorithms that may be implemented, for instance, in accordance with the second and/or third security policies as discussed herein. As additional examples, the term "light weight" in this context may mean a machine learning algorithm that is less computationally and/or memory intensive compared to the other machine learning algorithms that may be implemented in accordance with the application of the second and/or third security policies as discussed herein. Thus, a light weight machine learning algorithm may not require large processing instances and may be less accurate, but in some implementations the training does not need to be limited to a smaller data set compared to the other machine learning algorithms that may be implemented in accordance with the application of the second and/or third security policies as discussed herein. Thus, the light weight machine learning algorithm may function to not only recognize that a data entry contains a number of digits (e.g. 9 for a social security number), but may further recognize that the digits correspond to a specific format XXX-XX-XXXX.

The various machine learning algorithms as discussed herein with respect to any of the security policies may comprise any suitable type of machine learning model having any suitable architecture. For example, the machine learning algorithms as discussed herein may comprise supervised, semi-supervised, unsupervised, and reinforcement machine learning algorithms, which may be trained in accordance with any suitable set of training data. Example machine learning algorithm architectures may comprise artificial neural networks, support vector machines, Bayesian classifiers, etc.

The training data may comprise any suitable type of data depending upon the function to be performed by the corresponding machine learning algorithms in accordance with the particular security policy for which it is to be implemented. For instance, the training data may comprise a set of data entries that are similar (in length, format, content, structure, etc.) to the data entries that are expected to be accessed and subjected to the security policies as discussed herein. For example, if a machine learning model is trained to identify whether a data entry matches a social security data structure of XXX-XX-XXXX, then the training data may comprise sample data entries that are tagged (e.g. labeled) with an indication of whether each training data sample satisfies that particular predefined structure.

Thus, training data may be used to train any of the machine learning models as discussed herein to perform any suitable type of function. In some embodiments, such functions include performing predictions with respect to whether data entries match a predefined structure, which may include structures matching known types of sensitive data. In other embodiments, the machine learning algorithms may be trained to recognize whether a specific set of numbers, an alphanumeric string, etc., match a predefined data type, which may have a high probability of comprising sensitive data.

The machine learning algorithms may be iteratively trained in accordance with any suitable training techniques, including known techniques, until a desired accuracy of predictions is obtained, which may be measured for example based upon the analysis of a corresponding loss function. Furthermore, once trained in this manner, the machine learning algorithms as described herein may be refined and/or re-trained as additional predictions are made and subsequently verified manually or via the application of additional security policies. This may be implemented, for example, by supplementing or replacing the initial training data set with additional training data samples, which may comprise such previously-identified data entries and an accompanying tag (e.g. label) indicating the verified result (i.e. whether the data entry comprises sensitive or non-sensitive data) as a result of the application of one or more of the security policies as discussed herein. In this way, the use of machine learning algorithms as part of one or more security policies may provide flexibility and allow for a refinement of predictive accuracy over time as additional data entries are subjected to security policies. Additionally or alternatively, a continuous loop may be implemented to further train the machine learning model to improve accuracy. For example, as sensitive data entries are identified with a high-score and/or validated against a true data source, these data entries may be fed back into a training machine learning model to further increase the accuracy. Similarly, sensitive data entries identified from real-time application (e.g. of the first, second, and/or third security policies as discussed herein), such as nightly batch processing for instance, may be fed into the machine learning models for training purposes.

To enhance efficiency, the predetermined rules that are applied in accordance with this initial security policy may leverage information, if known, about the suspected type of data that is being scanned. For instance, if the column is suspected to contain social security numbers, then the security policy may apply predetermined rules based upon this knowledge, which aim to match a predefined data format that is identified with this type of sensitive data. For example, the predetermined rules may function to identify predetermined patterns identified with Personal Identifying Information (PII) such as social security numbers, birthdates, e-mail addresses, etc., as well as Payment Card Industry (PCI) information such as credit card numbers, bank identification numbers (BINs), etc.

Thus, and using the data entries 202 as shown in FIG. 2 as an example, the client device may apply a first or primary security policy to the subset of data entries 202.1 to compute a confidence score associated with these entries comprising sensitive data. This confidence score may be computed in any suitable manner, which may include any suitable combination of the predetermined rules as discussed herein. For example, the confidence score may represent a proportion of the data entries 202.1 that resulted in a match with respect to the application of one or more regular expressions. As another example, the confidence score may be computed in a weighted manner such that an increased number of regular expression matches to data formats of a known sensitive type results in an increased confidence score. To provide an illustrative example, if 60% of the data entries 202.1 match one regular expression for social security numbers (e.g. length), then the confidence score may be 60%, and this score may be further increased in a scaled manner as additional regular expressions are matched (e.g. the first three digits match those known to be identified with social security numbers). To provide a further illustrative example, a machine learning algorithm trained to recognize social security numbers may classify the probability of each data entry containing sensitive data, and the confidence score may represent an average of each of these outputs. As yet another example, a combination of the machine learning algorithm and regular expression matching results may be used (e.g. averaged) to provide the confidence score.

In any event, once the confidence score is computed in this manner, a thresholding system may be implemented to ensure that the entire column of data entries within the predetermined number of data entries 202 is classified as comprising sensitive or non-sensitive data, or whether further processing is needed to confidently make this determination. These thresholds may comprise any suitable values that may be configurable based upon the particular application. For example, a lower confidence score threshold may be 5%, 10%, 15%, etc. (i.e. likely to contain non-sensitive data), whereas an upper confidence score threshold may be 85%, 90%, 95%, etc. (i.e. likely to contain sensitive data).

If the result of this initial confidence score is less than the lower confidence score threshold or greater than the upper confidence score threshold, then the client device may either stop the data scanning operations or continue based upon the particular configuration. For instance, in some embodiments, when the initial confidence score is less than the lower confidence score threshold or greater than the upper confidence score threshold, then the entire column of data in the predetermined number of data entries 202 may be determined as comprising non-sensitive or sensitive data, respectively. As another example, in other embodiments, the scanning operation may continue for the entire column of data entries 202 regardless of whether the initial confidence score is less than the lower confidence score threshold or greater than the upper confidence score threshold. In other words, the confidence score computations may cease for a predetermined number of data entries 202 when the initial confidence score is outside the lower and upper confidence score thresholds or, alternatively, may be repeated irrespective of the confidence score. In this way, the confidence score may be identified by applying the primary security policy to an entire column of the predetermined number of data entries 202, or a smaller portion thereof.

In either case, the client device then performs a data profiling operation (which may be executed concurrently with the data scanning as part of the application of the primary security policy) on the entire column of data in the predetermined number of data entries 202, which results in updating the data entries in the column as containing either sensitive or non-sensitive data, the type of data (e.g. social security numbers), as well as the confidence score. This data profiling operation may comprise the application of any suitable number and/or type of additional predetermined rules, regular expressions, machine learning algorithms, requests for verification from a data owner, etc., that function to further identify and/or verify that the type of data in the column of the predetermined number of data entries 202 comprises sensitive data. In other words, the data profiling operation further classifies the scanned data entries in the column that may have had partial matches, mismatches, lower confidence scores, etc., from the initial application of the regular expressions, light weight machine learning algorithms, etc., as discussed above that were used to compute the initial confidence score.

As a result of the data profiling operation, metadata may additionally or alternatively be generated to indicate the results of the data profiling operation, which may be stored in the data table with the data entries 202 or at any other suitable location. In the event that secure data is identified, the client may also publish the results of the data profiling operation. This publishing process may comprise transmitting any suitable type of message to a client or other computing device to identify the location of the data entries comprising secure data, as well as the type of secure data. This may include, for example, transmitting a message to a suitable application that is known to utilize the data entries, such that the owner of the data entries may take the appropriate action. Such an action may comprise, for instance, modifying the manner in which the data entries are stored to satisfy a predefined security requirement. This may include encrypting the data entries, tokenizing the data entries, or performing any other suitable measures to ensure compliance with the appropriate regulatory authorities. Additionally or alternatively, the client device may automatically perform such measures upon identifying a column of data entries as comprising sensitive data.

In various embodiments, the client device may modify the manner in which one or more data entries (e.g. an entire column) are stored or, alternatively, such modifications may be performed by another computing device. For example, the relevant computing device that is modifying the manner in which the data entries are stored may be programmed with, access, or otherwise identify the manner in which the storage of sensitive data entries should be performed to meet predefined security requirements. Such requirements may include a level and/or type of data encryption. Additionally or alternatively, this may comprise performing tokenization of the data entries by replacing their contents with a token and moving the sensitive data entries to another storage location or portion of memory where the sensitive data entries are encrypted or otherwise protected via the need to enter secure credentials, a password, etc. Thus, the process of performing any of these measures may be automatically performed by any suitable device upon the data entries being identified as comprising sensitive data, which may include a suitable computing device executing a predetermined security routine, application, etc. to implement such measures being performed.

However, in the event that the initial confidence score is between the lower and the upper confidence score threshold, additional security policies may be applied to the subset of the data entries 202.1, or to a smaller portion thereof (as further discussed below). These additional security policies (e.g. second or secondary security policies) may then result in the computation of an updated confidence score associated with the previous application of the primary security policy, i.e. the scanned data entries 202.1 in the present example. The secondary security policy may be executed locally via the client device, or may implement additional or alternate computing devices such as external applications, tools, websites, etc.

For example, the secondary security policy executed at the client device may comprise another, more robust machine learning algorithm, additional regular expressions, etc., which may classify the data entries as part of a further data profiling operation. This machine learning algorithm and/or additional regular expressions may represent, for example, a more robust trained machine learning model (compared to the initial light weight model) and/or regular expressions that might not only recognize that a data entry contains a number of digits (e.g. 9 for a social security number), but may test for additional characters that would not be present in a social security number. Additionally or alternatively, such a machine learning algorithm may identify whether a data entry contains valid data based upon ranges of valid data for a portion of the data entries (e.g. for the prefix XXX for a social security number).

Thus, the second and/or third security policies may implement another machine learning algorithm as discussed herein, which may be more robust with respect to the initial light weight machine learning model as discussed above for the first security policy. The term "more robust" in this context means that these additional machine learning model(s) may have additional functionality and/or be trained in accordance with additional and/or alternate training data. For instance, a light weight machine learning algorithm used in accordance with the first security policy may function to verify whether a data entry matches a data structure that is known to comprise sensitive data. In addition to or instead of this determination, more robust machine learning models may be trained to identify the type of data that a data entry represents, whether the data entries contain valid data, etc. To do so, the more robust machine learning algorithms may be trained in accordance with respective training data sets, which comprise sample data entries and accompanying labels that may indicate information in addition to whether each entry comprises sensitive or non-sensitive data, such as the type of sensitive data entry, a valid/invalid indication (e.g. when a driver's license number is false based upon the encoded birthdate, etc.). As noted above for the light weight machine learning algorithms, the more robust machine learning algorithms may also be re-trained and/or modified over time to improve their performance by incorporating previously verified predictions of data entries into subsequent training data.

As another example, the client device may communicate with an external database, administrative authority, etc., to attempt to verify whether the data contained in the subset of the of data entries 202.1 match a specific data type, which may be implemented via a connection to a suitable statement of record (SOR) authority, website, database, etc., via an application programming interface (API) or other suitable secure connection. For example, the subset of data entries 202.1 (or a smaller portion thereof) may be transmitted to a Social Security Administration (SSA) server, website, etc., which in turns verifies whether the data entries that are sent are valid social security numbers, and thus should be treated as sensitive data. To ensure regulatory compliance, the client device may be configured to first encrypt and tokenize any data entries that are transmitted in this manner, particularly when such data transmissions are sent outside the data storage architecture 100.

Regardless of the type of predetermined rules, applications, etc. that are implemented as part of the secondary security policy, the client device uses the results of the secondary security policy to then update the confidence score. To provide an illustrative example, the client device may transmit a portion (e.g. 10%) of the subset of data entries 202.1 to an external entity for verification such as the SSA. The SSA may then verify that this portion of the data entries are social security numbers, and thus the confidence scores for those specific data entries would be 100%. These new confidence scores would then be used to update the previous confidence score, and the updated confidence score would once again be compared to the lower and the upper confidence score threshold.

As discussed above with respect to the primary security policy, if applying the secondary security policy to the subset of the data entries 202.1 (or a smaller portion thereof) results in the updated confidence score exceeding the upper confidence score threshold or falling below the lower confidence score threshold, then the current data scanning operations may stop entirely, or the primary security policies may continue to be applied to additional subsets of data entries within the data entries 202 in the column, depending upon the particular configuration. In the latter case, the secondary security policy may again be triggered if subsequent scanning operations of additional data entries result in the confidence score once again falling between the upper and lower confidence score threshold. Again, once the scanning operations have been completed, the client device may generate the metadata and/or store data in the table identified with the data entries 202 that indicates the current confidence score, as well as a classification of the data entries as being sensitive or non-sensitive, as noted above.

However, if applying the secondary security policies to the subset of the data entries 202.1 (or a smaller portion thereof) still results in the updated confidence score being between the upper and the lower confidence score threshold, then the client device may continue in one of two ways. In one scenario, the client device may continue to perform additional scanning operations on further subsets of data (or portions thereof), and may also continue the application of the first and second security policies as noted above until the updated confidence score exceeds the upper confidence score threshold or falls below the lower confidence score threshold. At this point, the client device may either stop scanning or continue scanning operations as noted above.

In an alternate scenario, the client device may transmit the subset of the data entries 202.1 (or a smaller portion thereof) to a further computing device, which applies a third or tertiary security policy to the data entries that are transmitted. This may include, for example, a client device transmitting the subset of data entries 202.1 (or a smaller portion thereof) to the centralized computing system 150. The centralized computing system 150 may then process the received data entries in accordance with the third security policy to verify whether received data entries comprise sensitive or non-sensitive data. The third security policy may comprise, for example, an exhaustive set of regular expressions, more robust machine learning algorithms, etc., and which may be used to perform data profiling in conventional systems as noted above. The centralized computing system 150 may apply the third security policy via execution of the instructions stored in the securities policy module 165 via the processing circuitry 160.

Additionally or alternatively, the third security policy may comprise the centralized computing system 150 communicating with a statement of record (SOR) or other suitable third-party authority to verify whether the received data entries comprise sensitive or non-sensitive data. In other words, the application of the third security policies may comprise a verification of a validity of the subset of data entries 202.1 based upon a data type. That is, if it is suspected that the received data entries comprise social security numbers as a result of the application of the first and/or second security policy, then the centralized computing system 150 may verify whether this is in fact the case with a high likelihood.

Once this verification is performed, the centralized computing system 150 may then transmit the result of this verification (which may include the determined type or classification of the data entries) as either sensitive or non-sensitive back to the client device. This result may be treated with high confidence (e.g. 90% or 100%) for the purposes of updating the confidence score for the subset of data entries 202.1, given the robust tools available to the centralized system 150. As a result, the client device may then update the current confidence score based upon the application of the third security policy via the centralized system 150. Additionally, these data entries and/or the corresponding confidence scores may then be utilized to further train the machine learning model to improve its accuracy or to optimize the regular expressions, as noted herein. As noted above, to ensure regulatory compliance, the client device and the centralized computing system 150 may each be configured to encrypt and/or tokenize any data entries that are transmitted in this manner, particularly when such data transmissions are sent outside the data storage architecture 100.

If applying the third security policy to the subset of the data entries 202.1 (or a smaller portion thereof) results in the updated confidence score still falling between the upper and the lower confidence score thresholds, then the current applications of the first security policy may continue with respect to further subsets of data entries, e.g. with respect to the subset of data entries 202.2, and so on. The client device may iteratively repeat this process, i.e. applying the primary security policy, computing an updated confidence score, and performing the second and/or third security policy if needed until the confidence score is calculated that exceeds the upper confidence score threshold or falls below the lower confidence score threshold.

Once the updated confidence score exceeds the upper confidence score threshold or falls below the lower confidence score threshold, then the operations may either stop entirely, or the application of the primary security policy may continue to be applied to additional subsets of data entries within the data entries 202 in the column, depending upon the particular configuration. In any event, once the data scanning and profiling operations have been completed, the client device may generate the metadata identified with the data entries and/or store separate data in the table identified with the data entries 202, which indicates the current confidence score as well as a classification of the particular column of data entries as being sensitive or non-sensitive, as noted above.

For any of the above-described configurations, embodiments include the size of the number of data entries that are scanned in subsequent operations being a function of the current confidence score. To provide an illustrative example, once the scanning and profiling operations are performed for the data entries 202, the social security number column for the data entries 202 may have a confidence score that exceeds the upper confidence score threshold (e.g. 95%). Therefore, when a subsequent scan is triggered for the data entries 204, the client device may access the data entries 204, but may initially scan a smaller portion of the subset of data entries 204.1 instead of the entire subset of data entries that would typically be scanned. Thus, if the result of applying the primary security policy to this portion of the subset 204.1 does not cause the confidence score to be reduced to less than the upper confidence score threshold, then the client device may identify the entire column labeled social security in the data entries 204 as comprising sensitive data, and take the same steps as noted above for the scanning of the data entries 202.

This may also be the case with respect to scanning and profiling iterations within the same set of data entries 202, 204, which may be implemented using alternative thresholds within the upper and the lower confidence score thresholds. To provide an illustrative example, if the upper and the lower confidence score thresholds are 10% and 90%, respectively, a smaller envelope of thresholds such as 20% and 80% may be established for subsequent scanning iterations within the same set of data entries 202, 204. For instance, the subset 204.1 of data entries may be scanned initially in their entirety, resulting in the confidence score being 82%. Then, subsequent iterations may be performed on a portion of the subset of data entries 202.2, i.e. a smaller number of data entries compared to those contained in the subset of data entries 202.1. This may advantageously improve efficiency by acknowledging that the confidence score is anticipated to quickly increase to exceed the upper confidence score threshold, and thus a lesser number of scanning and profiling operations are required.

Again, a tag or other information (such as metadata) may be stored upon completion of the application of security policies to a number of data entries, such as a column of data entries for the predetermined number of data entries 202, for instance. This metadata may indicate the location of the previously processed data entries, and may optionally include other information such as the confidence score for the previously-scanned data entries, the type of data entries, etc. In an embodiment, a client device may utilize this stored metadata to determine a location of the next data entries that are to be subsequently processed in accordance with the first security policy (and potentially in accordance with the second and/or third security policies based upon the resulting confidence score, as noted above). For example, as an initial process, the client device may randomly identify the location of the data entries 202 (and the subset of data entries 202.1) for the application of the first security policy (as well as others, if needed). However, once this has been completed, the client device may access the next predetermined number of data entries 204 by reading the metadata that was stored from the previous processing operations. In this way, the client device may leverage the stored metadata as an index such that the next data entries may be processed at the next location in the data storage component. This ensures that the data entries that were previously processed need not be re-processed, thereby saving time and processing resources. Alternatively, the client device may randomly select the set of data entries 204 while ensuring that the data entries 204 are outside of the previously-processed data entries 204.

It is further noted that, in various embodiments, the application of the first, second, and/or third security policies may be performed by any suitable combination of the local client device, the centralized computing system 150, or any other suitable computing devices as noted herein. Additionally, the various predetermined rules, machine learning algorithms, etc., that are described with respect to the first, second, and third security policies are provided by way of example and not limitation. Any set of the predetermined rules, executable machine learning algorithms, etc., that have been described herein with respect to a particular security policy may be omitted or be used as part of a different security policy.

For instance, in some embodiments, the second or third security policies may be optional. For example, in the scenarios described above, the first, second, and third security policies are each applied until a confidence score is determined that either exceeds the upper confidence score threshold or falls below the lower confidence score threshold. However, in some embodiments the second security policy may be omitted, and the third security policy may be utilized after the local application of the first security policy via the client device results in a confidence score that still remains between the upper and lower confidence score thresholds. In various embodiments, the application of any of the security policies as discussed herein may also comprise a manual review of the data entries to verify the associated data type, and in turn identify with a high level of confidence whether the data entries comprise sensitive or non-sensitive data. However, a manual review is not necessary, as the embodiments described herein aim to provide a fully automatic solution for protecting sensitive data entries.

Continuing this example using the above-referenced upper confidence score threshold of 80%, if the application of the first security policy to the subset of data entries 202.1 results in a confidence score of 65%, then the client device may transmit the subset of data samples 202.1 (or a portion thereof) to the centralized computing system 150 or other suitable application for a robust and exhaustive application of the third security policy such as verification with a SOR. In other words, the client device may be configured to transmit the subset of data entries 202.1 (or a portion thereof) for verification in accordance with the application of the third security policy when the result of the first security policy results in a confidence score that still remains within the upper and lower confidence score thresholds. In this way, the configuration may be adjusted by recognizing tradeoffs between balancing network traffic, bandwidth, and processing resources versus the desired speed at which the client device is able to determine whether a number of data entries contains sensitive or non-sensitive data entries.

Therefore, the application of the various security polices as discussed herein results in a determination of whether a number of data entries, e.g. a column of data entries as shown in FIG. 2, comprise sensitive or non-sensitive data with a high level of probability. The application of these security policies may be repeated over time such that a confidence score is computed for each column of a data table, thereby identifying whether each column contains sensitive or non-sensitive data via the use of the confidence scores and security policies as discussed herein.

Once a column of data entries is identified as containing secure or non-secure data (e.g. based upon the confidence score exceeding the upper confidence score threshold or being less than the lower confidence score threshold), the embodiments described herein may facilitate storing the data entries in the respective data storage components 104.1-104.3 based upon this determination. For example, for data entries identified as containing sensitive data, the data entries may be stored in any suitable manner that satisfy a predefined security requirement. This predefined security requirement may be, for example, any suitable type of requirement that meets regulatory requirements or other suitable requirements. As an example, the predefined security requirement may comprise a specific type of encryption or a minimum level of encryption that is applied to the column of data entries, and may additionally or alternatively comprise tokenizing the sensitive data (i.e. substituting a sensitive data element with a non-sensitive equivalent, referred to as a token). Some examples of encryption schemes that may be implemented for this purpose may include the AES256, XChaCha20, etc. In other words, the embodiments described herein enable the efficient identification of data entries that contain sensitive data, and enable the manner in which such data entries are stored to meet regulatory compliance when sensitive data entries are found.

The encryption and storage of the data entries identified as comprising sensitive data may be implemented via any suitable computing device, which may comprise the client device, the centralized computing system 150, or any other suitable computing device that has access to the data entries. For example, the storage handling module 119 may comprise executable instructions that, when executed by the processing circuitry 110 of a client device, cause a client device to generate metadata, encrypt, and/or store data entries that have been identified as comprising sensitive data. Additionally or alternatively, the client device may generate and transmit a notification (which may comprise part of the publication process noted above) that identifies a location of the data entries that comprise sensitive data, and the owner of the data entries may then ensure that regulatory compliance is met by encrypting the data entries.

As another example, the storage handling module 167 of the centralized computing system 150 may store, in the storage handling module 167, executable instructions that, when executed by the processing circuitry 160, cause the storage handling module 167 to generate metadata, encrypt, and/or store data entries that have been identified as comprising sensitive data. Additionally or alternatively, the centralized computing system 150 may generate and transmit a notification (which may comprise part of the publication process noted above) that identifies a location of the data entries that comprise sensitive data, and the owner of the data entries may then ensure that regulatory compliance is met by encrypting the data entries.

When a notification is transmitted, this may comprise any suitable type of notification, which may comprise part of the publication of metadata as noted herein. Thus, once a column of data is identified as comprising sensitive data entries, metadata may be stored with the data entries that identifies this information, and may optionally indicate other information such as the type of data, a location of the data, the confidence score, etc. The metadata may then be published as part of such notifications, which may comprise a transmission of the metadata (or any portion thereof) to any suitable application, computing device, entity, etc.

In an embodiment, the stored metadata may additionally or alternatively be used as feedback to re-train the machine learning models that may be applied in accordance with any of the security policies as discussed herein. For example, as security policies are applied to data entries as noted above, the stored metadata may indicate which data entries were previously identified as comprising sensitive or non-sensitive data. Thus, the metadata may be used as feedback to update any of the machine learning models as discussed herein. This may include, for instance, updating a set of training data to include the previously-processed data entries and their accompanying identification as comprising sensitive or non-sensitive data. Then, once re-trained in this manner, the machine learning models may more readily recognize subsequently-processed data entries. Although any of the machine learning models as discussed herein may benefit from such re-training processes, the machine learning models used in accordance with the first security policy may result in particularly advantageous results, as the need to apply additional security policies may be prevented or at least reduced.

Figure 3A:
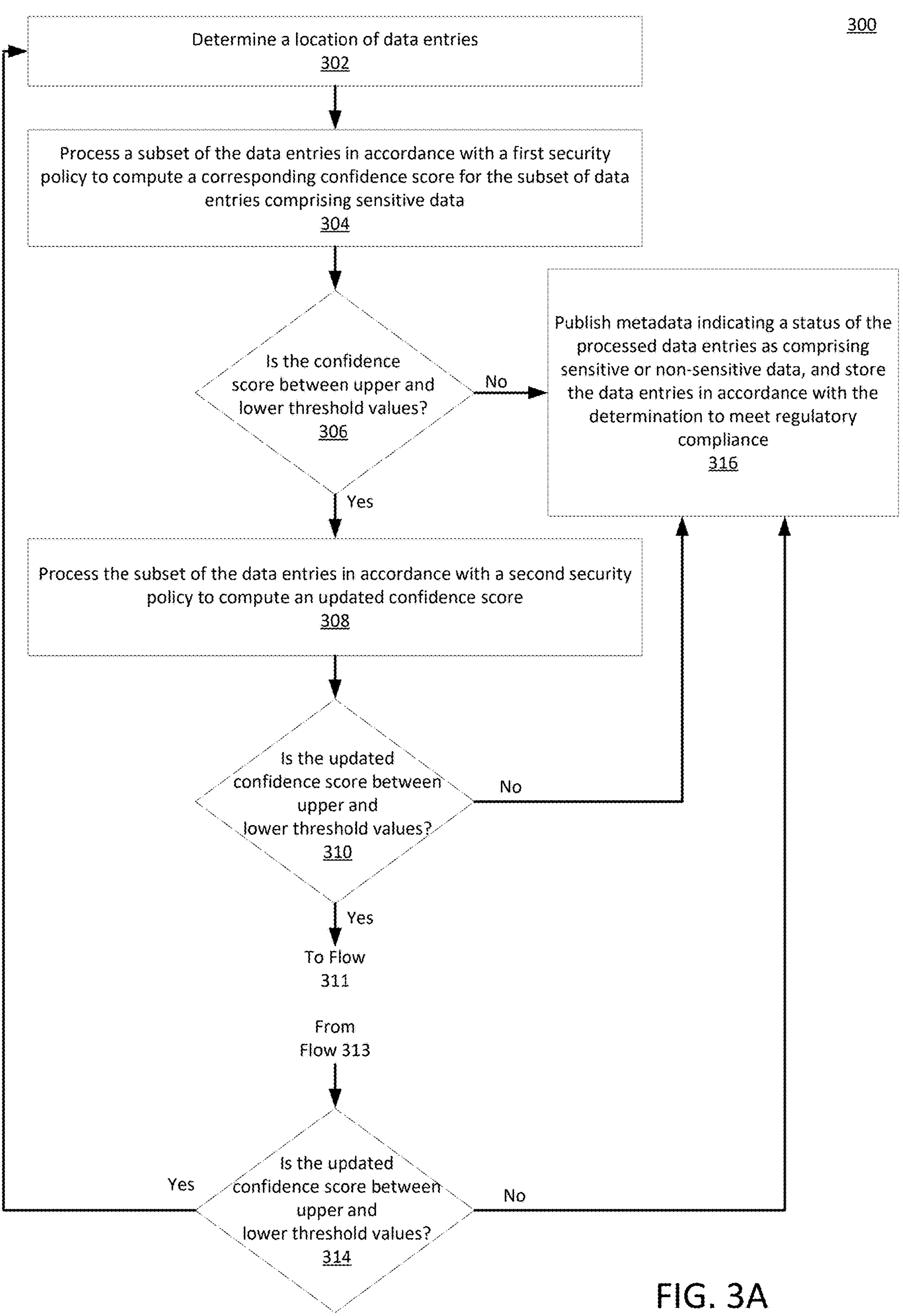
FIGS. 3A-3B illustrates an example process flow, in accordance with one or more embodiments of the disclosure.
Figure 3B:
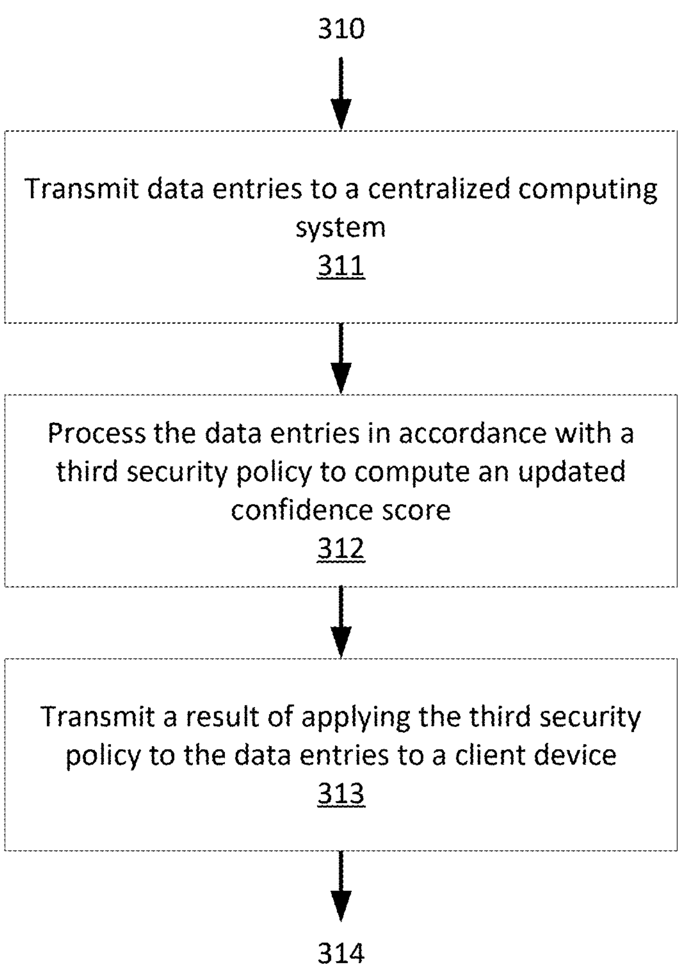

FIGS. 3A-3B illustrate an example process flow, in accordance with one or more embodiments of the disclosure. The process flow 300 is illustrative, and may include alternate or additional steps that are not shown in FIG. 2 for purposes of brevity, and may be performed in a different order than the steps shown in FIGS. 3A-3B, e.g. re-arranged, omitted, and/or re-configured as desired. For example, although the process flow 300 is discussed in terms of the application of each of the three security policies as noted herein, the process flow 300 may omit the second security policy in some embodiments. The steps as shown in the process flow 300 may be performed by any suitable number of computing devices. Thus, one or more computing devices may be provided that comprise one or more processors and memory storing instructions that, when executed by the one or more processors, cause the performance of any of the steps of FIGS. 3A-3B. As noted herein, the computing device may comprise, for example, a client device such as any of the computing devices 102.1-102.N and/or the centralized computing system 150. Thus, the non-transitory computer-readable media may comprise, for instance, the memory 114 of the client device or, alternatively, the memory 164 of the centralized computing system 150.

With reference to FIGS. 3A-3B, the process flow 300 may be a computer-implemented method executed by and/or otherwise associated with one or more processors (processing circuitry) and/or the execution of instructions stored in any suitable memory and/or storage devices. The functionality associated with the process flow 300 as discussed herein may be performed, for instance, via any suitable computing device and/or processing circuitry, which may be identified with a standalone computing device and/or computing system. Additionally or alternatively, the functionality associated with the process flow 300 may be performed, for example, via any suitable number of computing devices and/or computing systems, which may include networked, cloud-based, or any suitable architecture of computing devices that enables the computing devices to communicate with one another and/or to work in conjunction with one another. Again, in an embodiment, the computing device and/or computing system may be identified with the computing devices 102.1-102.N, the centralized computing system 150, and/or any other suitable computing devices, e.g. as shown and described herein with respect to FIG. 1.

The process flow 300 may begin by determining (block 302) a location of data entries within a data storage architecture, such as the data storage architecture 100 for example. The location of the data entries may be identified, for instance, with a predetermined number of data entries, such as the data entries 202 as discussed herein. The location of the predetermined number of data entries may be determined randomly (e.g. for an initial processing operation) or based upon stored metadata that identifies the location of previously-processed data entries. For example, the location of the data entries may correspond to a further subset of data entries within the same data table (e.g. the subset 202.2), or a starting location of another subset of data entries identified with a new predetermined number of data entries (e.g. the subset 204.1) corresponding to another data table.

The process flow 300 may further comprise processing (block 304) a subset of the data entries in accordance with a first security policy, and computing (block 304) a corresponding confidence score. The number of data entries that are processed in this manner may be the entire subset of data entries (e.g. for an initial operation) or may be a smaller portion thereof for subsequent operations, as noted herein. Thus, the application of the first security policy may include any suitable combination of scanning and data profiling operations, which may include the use of regular expressions, machine learning algorithms, etc.

The process flow 300 may further comprise determining (block 306) whether the confidence score is between a predetermined upper and lower threshold value. If not, this means that the confidence score is either less than the predetermined lower threshold value or greater than the predetermined upper threshold value. In such a case, then an adequate determination may be made regarding a larger set of data entries identified with the processed data entries (e.g. an entire column within the table of data entries) comprising either sensitive or non-sensitive data. As a result, the process flow 300 may continue to publish (block 316) metadata indicating the status of the processed data entries, and store the data entries to meet regulatory compliance when the data entries are determined to comprise sensitive data. Thus, the metadata may identify the location of the data entries that were processed or, alternatively, the location of the entire column of data entries from which the subset of data entries were processed. In this way, appropriate action may be taken to ensure that the data entries (or the entire column thereof) are adequately encrypted, tokenized, etc.

However, in the event that the confidence score is between the predetermined upper and lower threshold value, then further processing (block 308) is performed on the data entries. In this scenario, it is assumed that the second security policy is applied to the subset of data entries, although this is an optional step as noted herein. Again, the second security policy may comprise the additional application of regular expressions and/or additional machine learning algorithms that attempt to further identify the type of data entries, which are then used to update the confidence score.

The process flow 300 may further comprise determining (block 310) whether the updated confidence score is between the predetermined upper and lower threshold values. If not, then the process flow 300 may include the same step of publishing metadata and storing (block 316) the data entries as described above.

However, in the event that the updated confidence score is still between the predetermined upper and lower threshold values, then the data entries that were subjected to the first and second security policies (or a smaller portion thereof) may be transmitted (block 311) to a further computing device. In an embodiment, this may comprise the transmission of the data entries to the centralized computing system 150 as discussed herein. The data entries may be, for instance, encrypted and/or tokenized prior to transmission. For instance, encryption may comprise encrypting any data entries sent to the centralized computing device in accordance with any suitable encryption scheme, with the data entries being decrypted by the centralized computing system 150. Additionally or alternatively, the data entries may be tokenized by transmitting a token of the data entries and identifying their location.

The receiving computing device (e.g. the centralized computing system 150) may then perform further processing (block 312) on the data entries. This may include the application of a third security policy as noted herein, which may comprise the transmission of the subset of data entries or a smaller portion thereof to another computing device, such as a SOR or other third-party application that may verify whether the data entries may comprise sensitive data. In such a case, it is noted that the data entries may be encrypted and/or tokenized when transmitted to a further computing device for this purpose. Thus, and as noted above, the application of the third security policy may include accessing a statement of record, executing additional (e.g. more robust) machine learning algorithms, performing an exhaustive list of regular expressions, etc. The application of the third security policy thus functions to verify whether the received data entries comprise sensitive or non-sensitive data.

The result of applying the third security policy may then be transmitted (block 313) to the client device. Again, the result of applying the third security policy may be to verify with a high level of probability whether the data entries comprise sensitive data. Once received, and as result of the application of the third security policy, the confidence score is once again updated by the client device based upon the results of verifying the subset (or smaller portion thereof) of the data entries that were previously transmitted (block 311) by the client device.

The process flow 300 may further comprise determining (block 314) whether the confidence score is between the predetermined upper and lower threshold values. If not, then the process flow 300 may include the same step of publishing metadata and storing (block 316) the data entries as described above.

However, if the updated confidence score is still between the predetermined upper and lower threshold values, then additional processing operations are performed on further subsets of data entries (or portions thereof). For example, if the updated confidence score after applying the first, second, and third security policies to the subset of data entries 202.1 still falls within the upper and lower threshold values, then this process may be repeated for another subset of data entries 202.2. Again, the number of data entries that are subsequently processed may be dependent upon the updated confidence score, as noted above. Thus, this process may be iteratively repeated until the updated confidence score is either greater than the upper threshold value or less than the lower threshold value. This process may be repeated for each set of predetermined data entries that are accessed by the client device, which again may be re-triggered for subsequent processing operations when the triggering conditions are met.

Figure 4:
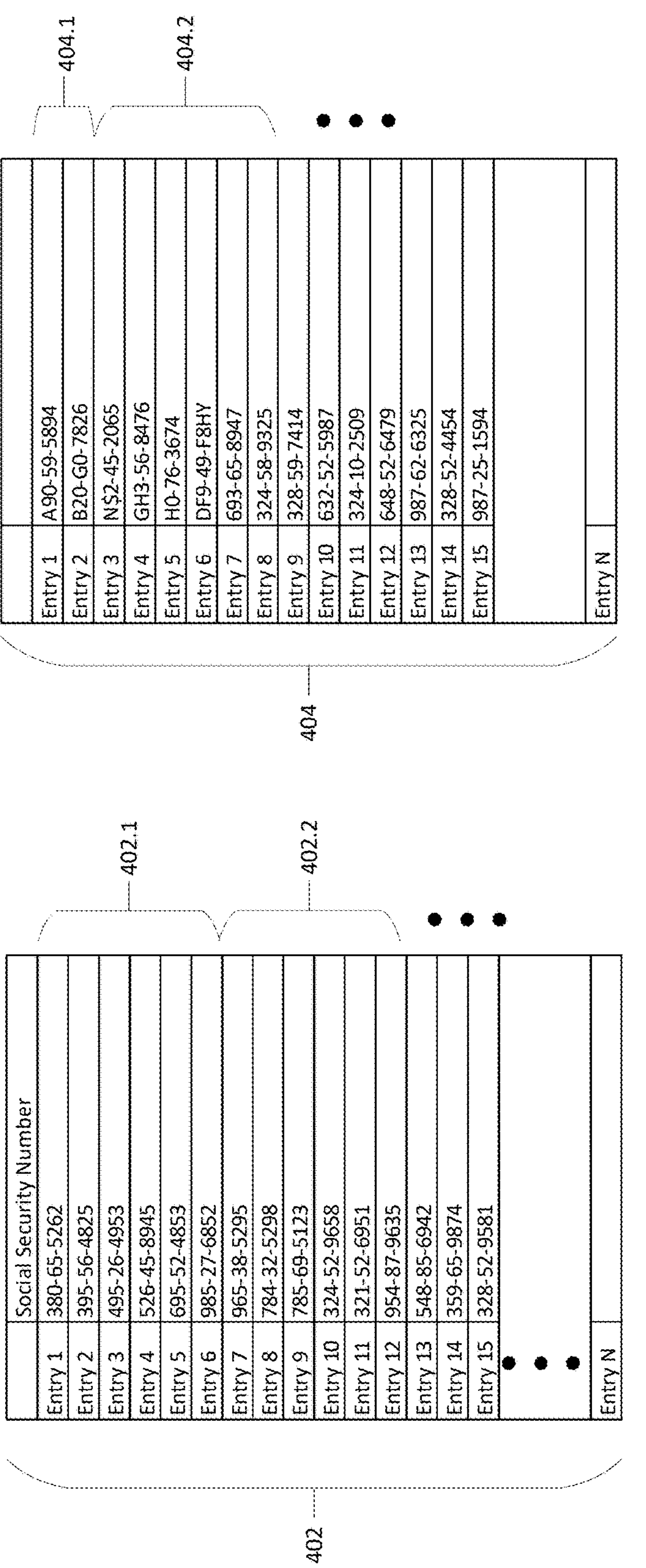
FIG. 4 illustrates a set of example data entries on which one or more security policies may be applied, in accordance with one or more embodiments of the disclosure.

FIG. 4 illustrates a set of example data entries on which one or more security policies may be applied, in accordance with one or more embodiments of the disclosure. The example data entries as shown in FIG. 4 are provided by way of example and not limitation, and it is noted that the number of data entries is significantly reduced for ease of explanation. The embodiments described herein may be applied to any suitable size of stored data entries. Moreover, the example data entries as shown in FIG. 4 may represent, in some embodiments, at least a portion of data that may be presented as part of a suitable user interface to enable a manual review of the application of any of the security policies as discussed herein.

As shown in FIG. 4, the data entries 402, 404 may be identified with a portion of the data entries 202, 204 as shown and discussed above with reference to FIG. 2. The example data entries provided in FIG. 4 allow for an illustrative example to be provided regarding how an individual column of data entries may be classified as comprising sensitive or non-sensitive data.

For instance, FIG. 4 shows a predetermined number of data entries 402, 404, which may correspond for example to the "social security number" column of the data entries 202, 204 as shown in FIG. 2. For this example, example data is shown for 15 of the data entries, although again this is by way of example, as there may be several hundred or several thousand entries contained in the data entries 402, 404. In this example, the subset of data entries 402.1 represents a total of 6 data entries. Therefore, the client device may, upon being triggered to do so, apply the first security policy to the subset of data entries 402.1 and compute a corresponding confidence score. For ease of explanation, the confidence score in this example is simply the number of matches with respect to the application of the regular expressions, although a light weight machine learning algorithm may also be used separately or in combination with the application of the regular expressions, for instance by averaging the results of both techniques.

Thus, if regular expressions are applied that match the data format known to be associated with social security numbers, i.e. numbers in the format XXX-XX-XXXX, then the confidence score after applying the first security policy to the subset of data entries 402.1 would be 100%. In response to this computation, the client device may continue scanning and profiling additional subsets of data, or simply stop and label the entire column as comprising sensitive data, depending upon the particular configuration.

In any event, the confidence score for the application of the first security policy to the predetermined number of data entries 402 is assumed to be 100%, i.e. every data entry matches the regular expression that is used (i.e. scores a "1"). Thus, if the predetermined lower and upper confidence score thresholds are assumed to be 20% and 80%, respectively, then the second and third security policies need not be applied. Then, upon the client device performing a subsequent scan (e.g. when it is re-triggered), the predetermined number of data entries 404 are accessed and the first security policy applied to the subset of data entries 404.1 However, the subset of data entries 404.1 is less than the size of the previous subset of data entries 402.1. This is because it is assumed that the confidence score of 100% exceeds a predetermined threshold that may be established to set the size of the data entries that are scanned and profiled in the next subsequent application of the first security policy by the client device. As noted above, this may be any suitable threshold value that is the same or different from the upper confidence score threshold of 80%.

As shown in FIG. 4, neither of the data entries in the subset of data entries 404.1 matches the aforementioned regular expressions, as each contains an alphabetic character. Thus, each of these would score a "0," pulling the confidence score down to 75% (i.e. 6 "1" scores and 2 "0" scores). As a result, the second and/or third security policies may be applied to the subset of data entries 404.1 (or a smaller portion thereof) to verify that the respective data entries do not comprise sensitive data. Upon the application of the second and/or third security policies, it is assumed that the updated confidence score is still 75%. Thus, the size of the data samples in the subsequently-scanned data entries 404.2 is increased, in this example to match the number of the data entries in the subset of data entries 402.1, 402.2.

As a result, the client device may continue applying the first, second, and/or third security policies to subsequent subsets of data samples until the updated confidence score is outside the lower and upper confidence score threshold values. The client device may continue to perform scanning operations, adjusting the size of the number of data entries, or alternatively determine that the entire column of data entries comprises sensitive or non-sensitive data once these thresholds are reached. In either case, each time the client device makes such a determination, the same steps as noted above with respect to the generation of metadata, transmission of notification messages, modification of data entry storage, etc., may be performed.

Conclusion

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect might not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions may result from computing devices, processors, controllers, or other devices executing the firmware, software, routines, instructions, etc. Further, any of the implementation variations may be carried out by a general-purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A computer-implemented method, comprising:

storing, by a centralized computing system and for a first user of a plurality of users, a first security policy and a second security policy, wherein the first security policy and the second security policy are configured to identify sensitive data, and wherein the first security policy, when implemented to process data, is less computationally intensive than the second security policy;

causing instantiation, at a client device associated by the first user, of execution of an application configured to implement the first security policy;

receiving, by the centralized computing system and from the application executing on the client device, first processing results corresponding to processing first data, stored by a data storage component, in accordance with the first security policy;

identifying, by the centralized computing system and based on the first processing results, second processing results by:

retrieving, from the data storage component, the first data; and processing the first data in accordance with the second security policy, wherein the second processing results indicate at least a portion of the first data that comprises first sensitive information; and causing, based on the second processing results, tokenization of the at least the portion of the first data that comprises the first sensitive information.

2. The computer-implemented method of claim 1, wherein the client device and the data storage component are located at a client premises, and wherein the centralized computing system is part of a cloud service.

3. The computer-implemented method of claim 1, wherein the first security policy is associated with use of a first machine learning algorithm to identify the sensitive data.

4. The computer-implemented method of claim 3, wherein the second security policy is associated with use of a second machine learning algorithm to identify the sensitive data, and wherein the second machine learning algorithm was trained using a greater quantity of training data than the first machine learning algorithm.

5. The computer-implemented method of claim 1, wherein the processing the first data in accordance with the second security policy comprises identifying whether a format of a first portion of the first data corresponds toa known format of sensitive data.

6. The computer-implemented method of claim 1, wherein the first processing results indicate a likelihood that the first data comprises sensitive data.

7. The computer-implemented method of claim 1, wherein the causing the tokenization of the at least the portion of the first data that comprises the first sensitive information comprises replacing first alphanumeric characters with second alphanumeric characters in a same format as the first alphanumeric characters.

8. A centralized computing system comprising:

one or more processors; and memory storing instructions that, when executed by the one or more processors, cause the centralized computing system to:

store, for a first user of a plurality of users, a first security policy and a second security policy, wherein the first security policy and the second security policy are configured to identify sensitive data, and wherein the first security policy, when implemented to process data, is less computationally intensive than the second security policy;

cause instantiation, at a client device associated by the first user, of execution of an application configured to implement the first security policy;

receive, from the application executing on the client device, first processing results corresponding to processing first data, stored by a data storage component, in accordance with the first security policy;

identify, based on the first processing results, second processing results by:

retrieving, from the data storage component, the first data; and processing the first data in accordance with the second security policy, wherein the second processing results indicate at least a portion of the first data that comprises first sensitive information; and cause, based on the second processing results, tokenization of the at least the portion of the first data that comprises the first sensitive information.

9. The centralized computing system of claim 8, wherein the client device and the data storage component are located at a client premises, and wherein the centralized computing system is part of a cloud service.

10. The centralized computing system of claim 8, wherein the first security policy is associated with use of a first machine learning algorithm to identify the sensitive data.

11. The centralized computing system of claim 10, wherein the second security policy is associated with use of a second machine learning algorithm to identify the sensitive data, and wherein the second machine learning algorithm was trained using a greater quantity of training data than the first machine learning algorithm.

12. The centralized computing system of claim 8, wherein the instructions, when executed by the one or more processors, cause the centralized computing system to process the first data in accordance with the second security policy by causing the centralized computing system to identify whether a format of a first portion of the first data corresponds toa known format of sensitive data.

13. The centralized computing system of claim 8, wherein the first processing results indicate a likelihood that the first data comprises sensitive data.

14. The centralized computing system of claim 8, wherein the instructions, when executed by the one or more processors, cause the centralized computing system to cause the tokenization of the at least the portion of the first data that comprises the first sensitive information by causing the centralized computing system to replace first alphanumeric characters with second alphanumeric characters in a same format as the first alphanumeric characters.

15. One or more non-transitory computer-readable media storing instructions that, when executed by one or more processors of a centralized computing system, cause the centralized computing system to:

store, for a first user of a plurality of users, a first security policy and a second security policy, wherein the first security policy and the second security policy are configured to identify sensitive data, and wherein the first security policy, when implemented to process data, is less computationally intensive than the second security policy;

cause instantiation, at a client device associated by the first user, of execution of an application configured to implement the first security policy;

receive, from the application executing on the client device, first processing results corresponding to processing first data, stored by a data storage component, in accordance with the first security policy;

identify, based on the first processing results, second processing results by:

retrieving, from the data storage component, the first data; and processing the first data in accordance with the second security policy, wherein the second processing results indicate at least a portion of the first data that comprises first sensitive information; and cause, based on the second processing results, tokenization of the at least the portion of the first data that comprises the first sensitive information.

16. The one or more non-transitory computer-readable media of claim 15, wherein the client device and the data storage component are located at a client premises, and wherein the centralized computing system is part of a cloud service.

17. The one or more non-transitory computer-readable media of claim 15, wherein the first security policy is associated with use of a first machine learning algorithm to identify the sensitive data.

18. The one or more non-transitory computer-readable media of claim 17, wherein the second security policy is associated with use of a second machine learning algorithm to identify the sensitive data, and wherein the second machine learning algorithm was trained using a greater quantity of training data than the first machine learning algorithm.

19. The one or more non-transitory computer-readable media of claim 15, wherein the instructions, when executed by the one or more processors, cause the centralized computing system to process the first data in accordance with the second security policy by causing the centralized computing system to identify whether a format of a first portion of the first data corresponds toa known format of sensitive data.

20. The one or more non-transitory computer-readable media of claim 15, wherein the first processing results indicate a likelihood that the first data comprises sensitive data.

* * * * *